United States Patent Office 3,073,837
Patented Jan. 15, 1963

3,073,837
PROCESS FOR THE PREPARATION OF 1,2,5,6-TETRAHYDRO-1-PHENETHYL - 2-(p-METHOXY-BENZYL)-3,4-DIMETHYLPYRIDINE AND INTERMEDIATE
Donald E. Rivard, Haddonfield, N.J., assignor to Smith Kline & French Laboratories, Philadelphia, Pa., a corporation of Pennsylvania
No Drawing. Filed Feb. 25, 1960, Ser. No. 10,884
6 Claims. (Cl. 260—297)

This invention relates to an advantageous process for the preparation of 1,2,5,6-tetrahydro-1-phenethyl-2-(p-methoxybenzyl)-3,4-dimethylpyridine which is an intermediate for 2'-hydroxy-5,9-dimethyl-2-phenethyl - 6,7-benzmorphan, a potent analgetic or pain-relieving agent with minimal toxicity or addiction potential. In addition this invention relates to 1,2-dihydro-1-phenethyl-2-(p-methoxybenzyl) - 3,4 - dimethylpyridine and 1,2,5,6-tetrahydro-1-phenethyl-2 - (p-methoxybenzyl) - 3,4 - dimethylpyridine useful as intermediates.

The process in accordance with this invention comprises the hydrogenation of 1,2-dihydro-1-phenethyl-2-(p-methoxybenzyl)-3,4-dimethylpyridine according to the following procedure:

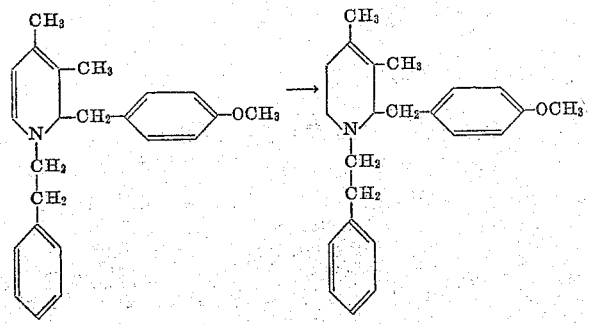

Previously described methods of reducing 1,2-dihydropyridines to 1,2,5,6-tetrahydropyridines do not include control of the reaction temperature nor regulation of the heat produced by the exothermic reaction [J. Org. Chem. 22: 1366 (1957)]. These methods when applied to 1,2-dihydro-1-phenethyl-2-(p - methoxybenzyl) - 3,4-dimethylpyridine provide very low yields of the corresponding 1,2,5,6-tetrahydropyridine. The novel method of this invention in which the temperature is controlled and held at about 0° to 18° C. during the hydrogenation and the amount of palladium catalyst used is less than about 25% by weight based on the dihydropyridine unexpectedly provides greatly increased yields of the product. For example by use of the novel hydrogenation process of this invention as one step in the preparation of the analgetic agent, 2'-hydroxy-5,9-dimethyl-2-phenethyl-6,7-benzmorphan, the yield of this valuable analgesic is increased about 3 to 4 times over the yield obtained by following the previously described methods.

The analgetic agent 2'-hydroxy-5,9-dimethyl-2-phenethyl-6,7-benzmorphan is prepared from 1,2,5,6-tetrahydro-1-phenethyl-2-(p-methoxybenzyl) - 3,4 - dimethylpyridine, which is produced by the novel hydrogenation process of this invention, by the following procedure:

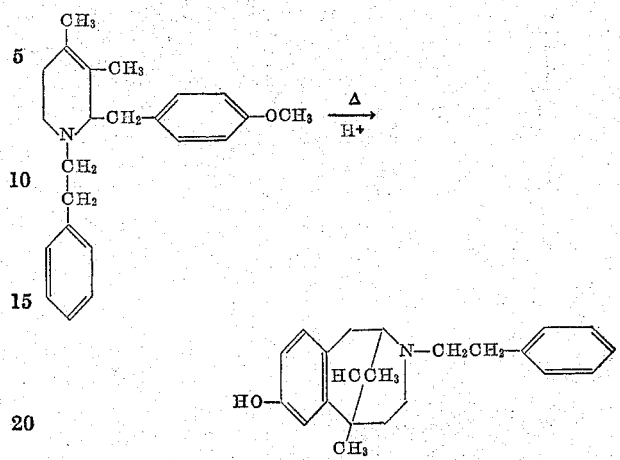

The cyclization is accomplished by heating the 1,2,5,6-tetrahydro-1-phenethyl-2 - (p - methoxybenzyl) - 3,4 - dimethylpyridine for prolonged periods in the presence of a cyclizing agent such as 48% hydrogen bromide solution, optionally, together with acetic acid. The reaction mixture is treated with chloroform and then made basic with ammonium hydroxide solution. The chloroform layer is separated and the chloroform is evaporated in vacuo while acetone is added continuously to separate crystals of the product 2'-hydroxy-5,9-dimethyl-2-phenethyl-6,7-benzmorphan.

According to the process of this invention 1,2-dihydro-1-phenethyl-2-(p-methoxybenzyl)-3,4-dimethylpyridine is hydrogenated using a palladium catalyst, such as palladium-on-charcoal, palladium-on-calcium carbonate, palladium oxide, or, preferably, palladium-on-barium sulfate, in an amount by weight of less than about 25%, preferably about 10 to 20%, of the dihydropyridine. The reaction is carried out at a temperature of about 0° to 18° C., preferably about 5° to 15° C. and at about 1 to 4 atmospheres pressure. Alternatively larger amounts of a palladium catalyst, poisoned by the addition of a catalyst poison such as an alkali metal iodide, for example potassium iodide or sodium iodide, can be used. The hydrogenation is carried out in a lower alkyl alcohol-hydrochloric acid solvent. The preferred lower alkyl alcohol solvents are those having 1–6 carbon atoms such as methanol, ethanol or isopropanol. The hydrochloric acid is advantageously added as a 1N solution. The reduction is preferably run until about 80–90% of the theoretical amount of hydrogen has been absorbed.

The 1,2-dihydro-1-phenethyl-2-(p-methoxybenzyl)-3,4-dimethylpyridine starting material for the process of this invention is prepared by condensing 3,4-dimethyl-1-phenethylpyridinium bromide with p-methoxybenzyl magnesium chloride. The reaction is carried out by heating in a solvent in which the reactants are at least partially soluble, preferably ethyl ether. Alternativey, other reactive esters or halides can be used to form the pyridinium quaternary salt and other halides can be used to form the benzyl Grignard reagent.

Of course, other variations in the structure of the reactants and products can obviously be substituted for those described such as other alkoxy compounds for instance the ethoxy or butoxy analogues. Such equivalent methods are included in this invention.

The following examples are not limiting but are illustrative of the method in accordance with this invention.

*Example 1*

A slurry of 584 g. of 3,4-dimethyl-1-phenethylpyridinium bromide, prepared by heating 3,4-lutidine with 2-iodoethylbenzene, in 2 l. of dry ether is stirred while 360 g. of p-methoxybenzyl magnesium chloride in ether solution is added. The mixture is stirred for 30 minutes, then treated 2.5 l. of water containing 625 g. of ammonium chloride and 250 ml. of concentrated ammonium hydroxide. The organic layer is extracted with hydrochloric acid solution. Neutralization of the acidic solution, extraction with ether and evaporation of the ether leaves 1,2-dihydro-1-phenethyl-2-(p-methoxybenzyl)-3,4-dimethylpyridine.

A cold solution of 800 g. of 1,2-dihydro-1-phenethyl-2-(p-methoxybenzyl)-3,4-dimethylpyridine in 2 l. of ethanol, 159 g. of 5% palladium-on-barium sulfate and 7.04 l. of cold 1 N hydrochloric is hydrogenated at 9–15° C. until 43 l. of hydrogen is absorbed. The reaction mixture is filtered and made basic with ammonium hydroxide. The oil is extracted into ether and the extracts are dried, concentrated and distilled to give 1,2,5,6-tetrahydro-1-phenethyl-2-(p-methoxybenzyl)-3,4-dimethylpyridine, B.P. 179–186° C. at 0.3 mm.

A solution of 454 g. of 1,2,5,6-tetrahydro-1-phenethyl-2-(p-methoxybenzyl)-3,4-dimethylpyridine in 750 ml. of acetic acid and 2.75 l. of 48% hydrobromic acid is refluxed for 20 hours. The mixture is poured onto crushed ice and chloroform. Ammonium hydroxide is added until the solution is basic. The chloroform layer is dried and concentrated in vacuo while acetone is added slowly. The crystals are filtered and dried to give 2'-hydroxy-5,9-dimethyl-2-phenethyl-6,7-benzmorphan, M.P. 180–181° C.

*Example 2*

A cold solution of 1 kg. of 1,2-dihydro-1-phenethyl-2-(p-methoxybenzyl)-3,4-dimethylpyridine, prepared as in Example 1, in 2.5 l. of ethanol is mixed with 245 g. of palladium-on-charcoal catalyst, 25 g. of potassium iodide and 7.5 liters of cold 1 N hydrochloric acid. Hydrogenation of this mixture is carried out at 10–15° C. until 54 liters of hydrogen are absorbed. The reaction mixture is filtered and made basic with ammonium hydroxide. Extraction with ether, concentration and distillation of the extracts gives 1,2,5,6-tetrahydro-1-phenethyl-2-(p-methoxybenzyl)-3,4-dimethylpyridine.

A mixture of 400 g. of the above prepared 1,2,5,6-tetrahydropyridine and 2.5 l. of 48% hydrobromic acid is refluxed for 24 hours, then quenched with crushed ice and chloroform. Treating with base and working up as in Example 1 gives 2'-hydroxy-5,9-dimethyl-2-phenethyl-6,7-benzmorphan.

What is claimed is:

1. The method of preparing 1,2,5,6-tetrahydro-1-phenethyl-2-(p-methoxybenzyl)-3,4-dimethylpyridine which comprises hydrogenating 1,2-dihydro-1-phenethyl-2-(p-methoxybenzyl)-3,4-dimethylpyridine using less than about 25% by weight of a palladium catalyst at from about 0–18° C. and at about 1–4 atmospheres pressure.

2. The method of claim 1 in which the catalyst is palladium-on-barium sulfate.

3. The method of claim 2 in which the reaction temperature is about 5–15° C.

4. The method of claim 1 in which the palladium catalyst is poisoned with potassium iodide.

5. The method of claim 1 in which the reaction is carried out in 1 N hydrochloric acid containing a substantial amount of a lower alkanol.

6. A chemical compound having the following fundamental formula:

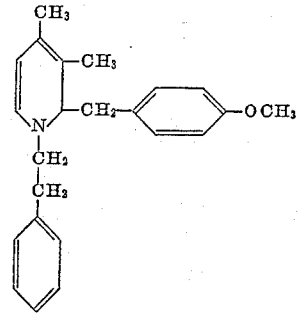

References Cited in the file of this patent

UNITED STATES PATENTS

| | | |
|---|---|---|
| 2,516,628 | Haury | July 25, 1950 |
| 2,704,759 | Gluesenkamp et al. | Mar. 22, 1955 |
| 2,959,594 | Gordon et al. | Nov. 8, 1960 |
| 2,967,182 | Pohland | Jan. 3, 1961 |
| 2,972,617 | Cislak | Feb. 21, 1961 |